United States Patent [19]
VanDeVyvere

[11] Patent Number: 5,244,181
[45] Date of Patent: Sep. 14, 1993

[54] HIGH FLOW INTERNAL EMERGENCY VALVE

[75] Inventor: Bryan E. VanDeVyvere, Lees Summit, Mo.

[73] Assignee: Knappco Corporation, Kansas City, Mo.

[21] Appl. No.: 939,149

[22] Filed: Sep. 2, 1992

[51] Int. Cl.$^5$ ............................................. F16K 51/00
[52] U.S. Cl. ..................................... 251/144; 251/241; 137/797
[58] Field of Search ................. 251/144, 241; 137/797, 137/347

[56] References Cited

U.S. PATENT DOCUMENTS

| | | | |
|---|---|---|---|
| 1,650,406 | 11/1927 | Welcker | 137/797 X |
| 2,237,377 | 4/1941 | Thwaits | 251/241 X |
| 3,399,695 | 9/1968 | Stehlin | 137/551 |
| 3,503,416 | 3/1970 | Clarkson | 137/375 |
| 4,009,862 | 3/1977 | DeFrees | 251/63 |
| 4,180,242 | 12/1979 | Reedy | 137/347 X |
| 4,335,744 | 6/1982 | Bey | 137/522 |
| 4,431,162 | 2/1984 | Carlson | 137/797 X |
| 4,643,219 | 2/1987 | Schmitt et al. | 137/454.6 |
| 4,934,403 | 6/1990 | Mooney et al. | 137/315 |
| 5,099,870 | 3/1992 | Moore et al. | 137/71 |

OTHER PUBLICATIONS

"6"×4" High Flow Emergency Valve," Betts Indus., Inc. Sep. 1990 Section 30, p. 9A.

Primary Examiner—Martin P. Schwadron
Assistant Examiner—Kevin L. Lee
Attorney, Agent, or Firm—Silverman, Cass & Singer, Ltd.

[57] ABSTRACT

A high flow emergency valve contained within an interior of a storage tank having an opening and a valve seat about the opening including a housing member for sealing and unsealing the valve seat, a push rod member for engagement with and activation of the housing to seal and unseal the valve seat, the push rod including a first portion positioned within the housing and a second portion extending out of a housing aperture to the tank exterior for manipulation from the exterior of the tank to open and close the valve seat, a sleeve member for substantially enclosing the first portion of the push rod within the housing and providing sealed sliding engagement between the push rod and the sleeve, a connecting member for attaching a portion of the sleeve against movement with respect to the valve seat, an engagement member between the housing and the sleeve for sealed sliding movement of the housing with respect to the sleeve, and a biasing member for maintaining the housing in a normally closed position with respect to the valve seat and providing a spring bias to the push rod during manipulation to unseal the valve seat.

8 Claims, 1 Drawing Sheet

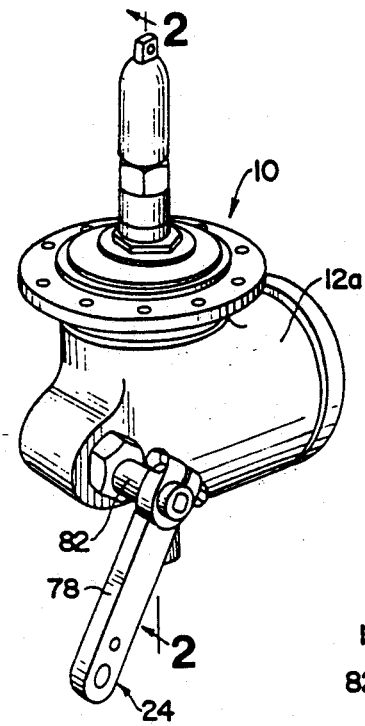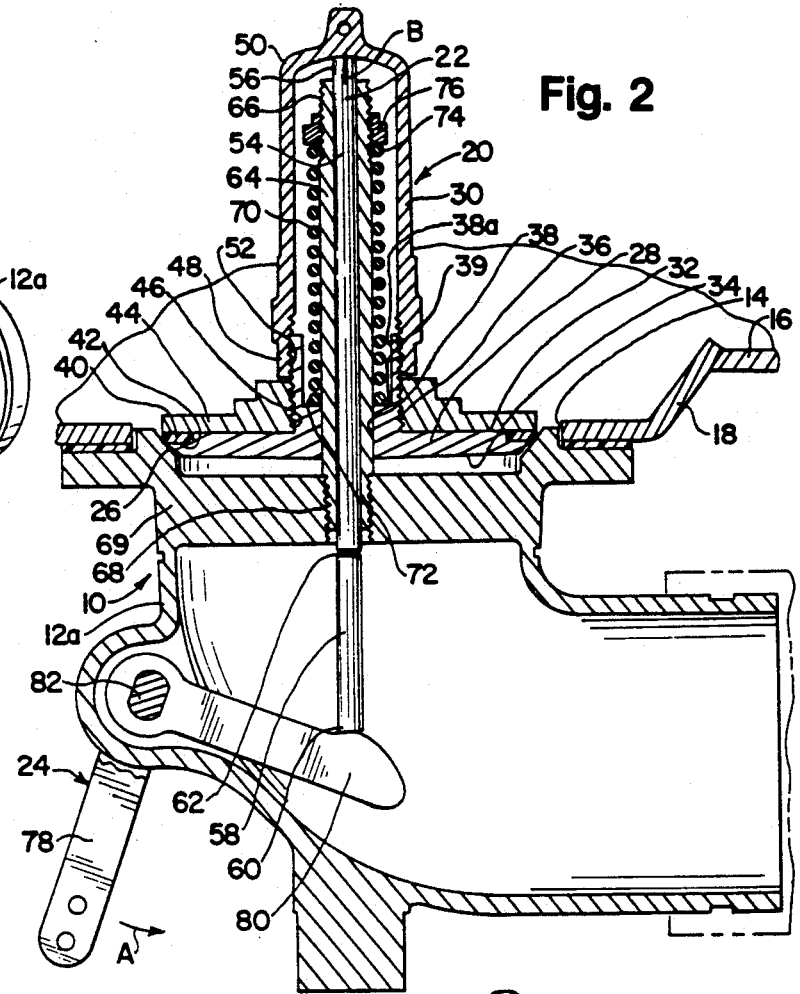

HIGH FLOW INTERNAL EMERGENCY VALVE

BACKGROUND OF THE INVENTION

1. Field of the Invention

This invention relates generally to valves for storage tanks, and more particularly, to a high flow emergency valve positioned substantially within the interior of a storage tank which provides a simple, sturdy structure to open and close the valve, normally maintains the valve in a closed position even in an emergency, does not impede material flow to provide high flow of material into or out of the storage tank, can be adjusted and readily can be activated from the exterior of the storage tank either manually or with additional mechanical or electrical control mechanisms.

2. Description of the Related Art

Emergency valves for storage tanks are known. An example of such a valve is illustrated in U.S. Pat. No. 4,934,403 which discloses a readily inspectable and cleanable emergency valve for a storage tank. The valve assembly is opened by a first operating unit having a portion adapted for accessibility from the exterior of the tan including a fluid power connection for selectively supplying pressurized fluid to the first operating unit. The first operating unit includes a stem 28 which bears directly on a valve head 24 connected thereto and spring loaded from the interior of the tank. Such a valve, however, cannot be activated manually and relies upon pushing open of the valve head 24 which requires further structural connections with respect to, and on the interior of, the tank to provide the necessary restrictive force against which the spring and stem can react. The additional structural connections significantly impede the flow of material into and out of the valve thereby reducing the valve flow rate.

U.S. Pat. No. 4,009,862 discloses a remotely controlled fluid pressure actuated internal emergency valve for the outlet opening of a liquid storage tank which automatically closes the outlet port in the valve in the event of various emergency situations. The valve includes a movable housing which is spring biased to maintain the housing in the closed position and is activated by hydraulic fluid controlled and provided from the exterior of the tank and valve. Such a valve, however, not only requires complex hydraulic fluid seals within the valve but cannot be activated manually and includes large structural elements positioned within the tank interior which significantly impedes the flow of material through the valve thereby reducing the valve flow rate.

It therefore would be desirable to provide an emergency valve substantially positioned within the interior of a storage tank having a high flow rate which provides a simple sturdy structure to open and close the valve, normally maintains the valve in the closed position even in an emergency, provides high material flow through the valve by reducing the valve structure which typically impedes the material flow, can be adjusted and readily can be activated from the exterior of the tank either manually or with additional mechanical or electrical control mechanisms.

SUMMARY OF THE INVENTION

The invention provides a high flow emergency valve contained within an interior of a storage tank having an opening and a valve seat about the opening. The valve includes a housing for sealing and unsealing the valve seat and a push rod for engagement with and activation of the housing. The push rod includes a first portion positioned within the housing and a second portion extending out of a housing aperture to the tank exterior for manipulation from the exterior of the tank to open and close the valve seat. A sleeve is included for substantially enclosing the first portion of the push rod within the housing and providing sealed sliding engagement between the push rod and the sleeve. A connecting member is included for attaching a portion of the sleeve against movement with respect to the valve seat. An engagement member is provided between the housing and the sleeve for sealed sliding movement of the housing with respect to the sleeve. A biasing member also is included for maintaining the housing in a normally closed position with respect to the valve seat and providing a spring bias to the push rod during manipulation to unseal the valve seat.

BRIEF DESCRIPTION OF THE DRAWINGS

FIG. 1 is a perspective view of the valve of the invention illustrated in conjunction with an elbow outlet pipe;

FIG. 2 is a cross-sectional view of the valve of the invention in its closed position taken along line 2—2 of FIG. 1 and in the direction indicated generally and illustrated attached to an outlet opening of a storage tank;

FIG. 3 is a cross-sectional view of the valve of the invention similar to FIG. 2 illustrating the valve in its open position to permit high material flow into or out of the tank; and FIG. 4 is a side elevational view of the valve of the invention illustrated in conjunction with a straight outlet pipe and with a portion of the outlet pipe broken away.

DESCRIPTION OF THE PREFERRED EMBODIMENTS

Referring to FIGS. 1–4, the valve of the invention is designated generally by the reference numeral 10. Preferably, the valve 10 is made of metal and is utilized in conjunction with an outlet pipe 12 which is illustrated in FIGS. 1–3 as an elbow 12a and in FIG. 4 as a straight pipe 12b. It is to be understood, however, that the valve 10 can be made of any desired material and utilized without an outlet pipe 12 so long as the valve 10 operates substantially as described herein.

As FIGS. 2 and 3 illustrate, the valve 10 preferably is utilized to open and close an outlet 14 of a storage tank 16, such as a stationary tank or tanker truck, having a desired liquid, powder granular or other material therein (not illustrated). Typically, the outlet 14 of the tank 16 includes a sump portion 18 to which the valve 10 is connected by bolts (not illustrated). Alternatively, the valve 10 can be connected directly to the tank 16 in which case the outlet 14 would be formed as part of the tank 16.

The valve 10 preferably includes a housing 20, push rod 22, activating lever 24 and a tapered circular valve seat 26 which is formed as part of the outlet pipe 12. It is to be noted that the valve seat 26 can be formed as part of the tank 16 or sump portion 18, if desired, without departing from the teachings of the present invention.

Briefly, in operation, the normally at-rest or closed position of the housing 20 is illustrated in FIG. 2 and is maintained in that position due to a spring bias as will be described in detail below. Upon rotation of the lever 24 in the direction of arrow "A", the push rod 22 is moved in the direction of arrow "B" to contact the housing 20. Upon further rotation of the lever 24, the spring bias is overcome to lift the housing 20 away from the valve seat 26, as FIG. 3 illustrates, and open the valve 10 to empty or load the tank 16.

As FIG. 2 illustrates, the housing 20 includes a base portion 28 and a bell-shaped chamber portion 30 connected thereto. The base portion 28 substantially is disc-shaped having a top surface 32, a bottom surface 34, a central nipple 36 having threads about its exterior surface and formed extending away from the first top surface 32 and a central aperture 38 extending through the nipple 36 and the base portion 28. The aperture 38 is enlarged at a portion 38a to provide a recess 39 within the interior of the nipple 36 for seating of a spring therein as described below.

To provide a seal between the valve seat 26 and the base portion 28 of the housing 20, the perimeter of the base portion 28 is tapered to complement the taper of the valve seat 26. Additionally, a seat ring 40 is included to assist in sealing the valve seat 26.

The seat ring 40 is positioned within a annular recess 42 formed about the perimeter of the top surface 32 of the base portion 28 and extends slightly outside the confines of the recess 42 to contact and seal the valve seat 26. To hold the seat ring 40 within the recess 42, a disc-shaped collar or nut 44 is utilized having a central threaded aperture 46 for threading engagement with the threaded nipple 36 of the base portion 28. The collar 44 thereby captures the seat ring 40 between the collar 44 and the base portion 28 when the collar 44 is threaded onto the nipple 36.

The bell-shaped chamber portion 30 of the housing 20 includes a first open proximal end 48 and a second opposite closed distal end 50. To connect the chamber portion 30 to the base portion 28, an interior surface 52 proximate the first end 48 of the chamber portion 30 is threaded for threading engagement with a portion of the nipple 36 which extends above the collar 44. To assist in preventing leakage into the housing 20, a gasket (not illustrated) can be inserted between the first end 48 of the chamber portion 30 and the collar 44 if desired.

The rod 22 includes a first portion 54 having a first end 56 for engagement with the second closed distal end 50 of the chamber portion 30 and a second portion 58 having a second end 60 for engagement with a portion of the lever 24. The first and second portions 54 and 58 of the rod 22 are separated by a shear groove 62 formed about the exterior surface of the rod 22 and extending into the surface of the rod 22 a predetermined distance. As will be explained below, the shear groove 62 enables the valve 10 to remain in its normally closed position if the outlet pipe 12 is broken away.

To connect the housing 20 to the outlet pipe 12 and guide the push rod 22 within the housing 20 while enabling the desired movement of both the housing 20 and push rod 22, a hollow sleeve or stem 64 is provided. The sleeve 64 has a predetermined length and is threaded at both a first end 66, positioned within the housing 20, and a second end 68, threadedly connected to an engagement portion 69 of the outlet pipe 12. The sleeve 64 extends through and is sealed for sliding engagement with respect to the aperture 38 of the base 28 of the housing 20, with or without an additional sealing member (not illustrated).

To provide the desired spring bias to the valve 10, a spring 70 having a predetermined spring force is positioned about the sleeve 64 within the chamber 30 of the housing 20. The spring 70 includes a first end 72 seated within the recess 39 of the nipple 36 and a second end 74 seated against a lock nut 76 threadedly attached to the first end 66 of the sleeve 64.

To connect the second end 68 of the sleeve 64 to the outlet pipe 12 and enable flow of material through the valve 10, the engagement portion 69 of the outlet pipe 12 is formed as a spider having a central threaded aperture 68. As explained in detail below, this connection anchors the sleeve 64 and provides the desired holding force against the force of the spring 70 and the movement of the push rod 22 during opening of the valve 10 It is to be understood that the portion 69 can be formed in a variety of shapes and sizes, can be connected by a simple stem and interconnected directly to the tank 16, if desired, so long as the valve 10 functions as described herein.

To open and close the valve 10, the lever 24 includes an exterior handle portion 78 for manual or machine engagement, such as with a mechanical or electrical motor or hydraulics or air components. To engage the second end 60 of the push rod 22, the lever 24 includes an interior cam rod 80 connected to the handle 78 through a shaft 82. To prevent fluid flow about the shaft 82, a sealing ring or packing (not illustrated) can be utilized.

FIG. 2 illustrates the valve 10 in its at-rest closed position where the spring 70 provides a spring bias between the lock nut 76 of the sleeve 64 and the recess 39 of the base 28 of the housing 20. To open the valve 10, the handle 78 is rotated in the direction of arrow "A" which is downward with respect to FIG. 2. As FIG. 3 illustrates, upon rotation of the handle 78 the cam rod 80 and push rod 22 are moved in the direction of arrow "B" which is upward with respect to FIGS. 2 and 3.

The push rod 22 provides an initial force against the housing 20. If such an initial force is insufficient to overcome the bias of the spring 70, the valve 10 remains closed. Upon continued pressure and rotation of the handle 78, the push rod 22 overcomes the bias of the spring 70 and compresses the spring 70 to eventually force the housing 20 upward and the base 28 out of sealing engagement with the valve seat 26. This enables material either to flow into or out of the valve 10 as desired. To maintain the valve 10 in the opened position of FIG. 3, a detent position of the lever 24 or a separate locking member (not illustrated) can be provided.

It is to be noted that the valve 10 of the present invention includes adjustability of the bias of the spring 70. Thus, the pressure required for opening the valve 10 can be varied. Specifically, the lock nut 76 can be positioned at different points along the threaded portion of the first end 66 of the sleeve 64 to provide the desired adjustability. To provide further adjustability, the spring 70 can be replaced with a spring of a different size and/or strength.

Modifications and variations of the present invention are possible in light of the above teachings. A specific dimension, material or construction is not required so long as the valve 10 functions as herein described. It therefore is to be understood that within the scope of the appended claims the invention may be practiced otherwise than as specifically described.

What is claimed and desired to be secured by Letters patent is:

1. A high flow emergency valve contained within an interior of a storage tank having an opening and a valve seat about the opening, comprising:

housing means for sealing and unsealing the valve seat;

push rod means for engagement with and activation of said housing means to seal and unseal said valve seat, said push rod means having a first portion positioned within said housing and a second portion extending out of a housing aperture to the tank exterior for manipulation from the exterior of the tank to open and close said valve seat;

sleeve means for substantially enclosing said first portion of said push rod means within said housing and providing sealed sliding engagement between said push rod means and said sleeve means;

connecting means for attaching a portion of said sleeve means against movement with respect to said valve seat;

engagement means between said housing and said sleeve means for sealed sliding movement of said housing with respect to said sleeve means; and biasing means for maintaining said housing means in a normally closed position with respect to said valve seat and providing a spring bias to said push rod means during manipulation to unseal said valve seat.

2. The valve as defined in claim 1 including an outlet pipe connected to the tank exterior for accepting material flow from said valve seat and housing said second portion of said push rod means, said outlet pipe including a lift lever connected to a side wall thereof, said lift lever being in operable communication with said push rod means and having a portion thereof extending to the exterior of said outlet pipe for manipulation to open and close said valve seat through said push rod means.

3. The valve as defined in claim 1 wherein said biasing means are adjustable to vary the amount of bias applied to said valve seat.

4. The valve as defined in claim 2 wherein said valve seat is formed as a portion of said outlet pipe.

5. The valve as defined in claim 1 wherein said connecting means are formed as a spider.

6. The valve as defined in claim 2 wherein said connecting means are formed as a portion of said outlet pipe.

7. The valve as defined in claim 2 wherein both said push rod means and said outlet pipe include means for shearing to enable said push rod means and said outlet pipe to be broken away from said valve while maintaining said valve in a closed position.

8. A high flow emergency valve contained within an interior of a storage tank having an opening on a bottom surface thereof and a valve seat about the opening, comprising:

a housing for direct engagement with said valve seat on the bottom of the tank to seal and unseal said valve seat;

push rod means for engagement with and activation of said housing to seal and unseal said valve seat, said push rod means having a first portion positioned within said housing and a second portion extending out of a housing aperture to a tank exterior for manipulation from the tank exterior to open and close said valve seat;

an elongate sleeve for substantially enclosing said first portion of said push rod means within said housing;

seal means for providing sealed sliding engagement between said push rod means and said sleeve;

connecting means for attaching a portion of said sleeve against movement with respect to said valve seat;

engagement means between said housing and said sleeve means for sealed sliding movement of said housing with respect to said sleeve means; and spring biasing means for maintaining said housing in a normally closed position with respect to said valve seat and providing a spring bias to said push rod means during manipulation to seal and unseal said valve seat.

* * * * *

UNITED STATES PATENT AND TRADEMARK OFFICE
CERTIFICATE OF CORRECTION

PATENT NO. : 5,244,181
DATED : September 14, 1993
INVENTOR(S) : Bryan VanDeVyvere It is certified that error appears in the above-indentified patent and that said Letters Patent is hereby corrected as shown below:

Column 1, line 24, change "tan" to --tank--;

Column 2, line 53, after "powder" insert a comma (,);

Column 5, line 2, change "patent" to --Patent--.

Signed and Sealed this

Fifteenth Day of March, 1994

*Attest:*

BRUCE LEHMAN

*Attesting Officer*   *Commissioner of Patents and Trademarks*